US 11,485,218 B2

(12) United States Patent
Großgebauer et al.

(10) Patent No.: US 11,485,218 B2
(45) Date of Patent: Nov. 1, 2022

(54) CONE ELEMENT ACTING AS A CLUTCH IN A K0 INSTALLATION SPACE (71) Applicant: ZF FRIEDRICHSHAFEN AG, Friedrichshafen (DE)

(72) Inventors: Uwe Großgebauer, Erlabrunn (DE); Steffen Einenkel, Priesendorf (DE); Axel Rohm, Schonungen (DE); Thomas Dögel, Nüdlingen (DE); Tobias Höche, Hofheim i. UFr. (DE); Daniel Lorenz, Bad Kissingen (DE); Thomas Drexlmaier, Würzburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/293,810

(22) PCT Filed: Nov. 15, 2019

(86) PCT No.: PCT/EP2019/081461
§ 371 (c)(1),
(2) Date: May 13, 2021

(87) PCT Pub. No.: WO2020/099626
PCT Pub. Date: May 22, 2020

(65) Prior Publication Data
US 2022/0009334 A1    Jan. 13, 2022

(30) Foreign Application Priority Data
Nov. 16, 2018   (DE) .................... 10 2018 219 676.1

(51) Int. Cl.
*B60K 6/48* (2007.10)
*B60K 6/387* (2007.10)
(Continued)

(52) U.S. Cl.
CPC ............... *B60K 6/387* (2013.01); *B60K 6/26* (2013.01); *B60K 6/405* (2013.01); *B60K 6/48* (2013.01);
(Continued)

(58) Field of Classification Search
CPC .......... B60K 6/387; B60K 6/26; B60K 6/405; B60K 6/48; F16D 13/24; F16D 25/0632; H02K 9/19
See application file for complete search history.

(56) References Cited

U.S. PATENT DOCUMENTS 10,886,177 B2   1/2021  DeLaCruz et al.
2011/0239818 A1* 10/2011 Kasuya ................ F16D 25/123
                                              903/902

(Continued)

FOREIGN PATENT DOCUMENTS

DE   102009059944   7/2010
DE   102015201931   8/2016
(Continued)

OTHER PUBLICATIONS

Office Action dated Apr. 28, 2022 issued in U.S. Appl. No. 17/293,763.

*Primary Examiner* — David J Hlavka
(74) *Attorney, Agent, or Firm* — Cozen O'Connor (57) ABSTRACT

An oil guide of a hybrid module for a vehicle which is arranged in a drivetrain between a drive unit, particularly an internal combustion engine, and an output. An electric machine is provided, and a rotor of the electric machine is connected to the output. A clutch is provided between the drive unit and the electric machine. The clutch has oil conducting elements in order to supply the electric machine with cooling oil. A further aspect of the invention is a hybrid module with such an oil guide.

8 Claims, 11 Drawing Sheets (51) Int. Cl.
  *B60K 6/405* (2007.10)
  *F16D 25/0632* (2006.01)
  *B60K 6/26* (2007.10)
  *F16D 13/24* (2006.01)
  *H02K 9/19* (2006.01)

(52) U.S. Cl.
  CPC ......... *F16D 13/24* (2013.01); *F16D 25/0632* (2013.01); *H02K 9/19* (2013.01); *B60Y 2200/92* (2013.01); *B60Y 2306/05* (2013.01); *B60Y 2400/424* (2013.01)

(56) References Cited

U.S. PATENT DOCUMENTS

| | | | | |
|---|---|---|---|---|
| 2011/0259698 | A1* | 10/2011 | Arnold | F16D 25/0638 192/48.1 |
| 2013/0193816 | A1* | 8/2013 | Iwase | B60L 50/16 310/75 R |
| 2014/0057489 | A1* | 2/2014 | Reed | H01R 13/60 439/569 |
| 2015/0000262 | A1 | 1/2015 | Iwase et al. | |
| 2017/0080793 | A1* | 3/2017 | Suyama | F16H 57/042 |
| 2017/0326962 | A1* | 11/2017 | Aringsmann | F16D 13/24 |

FOREIGN PATENT DOCUMENTS

| | | |
|---|---|---|
| EP | 3401565 | 11/2018 |
| WO | WO 2015/126719 | 8/2015 |

\* cited by examiner

CONE ELEMENT ACTING AS A CLUTCH IN A K0 INSTALLATION SPACE

CROSS REFERENCE TO RELATED APPLICATIONS

This is a U.S. national stage of Application No. PCT/EP2019/081461 filed Nov. 15, 2019. Priority is claimed on German Application No. DE 10 2018 219 676.1 filed Nov. 16, 2018 the content of which is incorporated herein by reference.

BACKGROUND OF THE INVENTION

1. Field of the Invention

The disclosure is directed to a hybrid module comprising an internal combustion engine and an electric machine, wherein a disconnect clutch, also known as K0, is provided between the internal combustion engine and the electric machine.

2. Description of Related Art

Hybrid modules with a K0 are known from the prior art. The K0 requires extensive additional installation space, which has an adverse effect on vehicle design. Further, the constructions put forth as solutions are relatively complex and lead to extensive manufacturing expenditure.

SUMMARY OF THE INVENTION

It is the object of one aspect of the invention to provide a hybrid module that requires less installation space, is less complex to construct and/or is more easily producible compared with the prior art.

This object is met through the embodiment forms described in the following.

According to one aspect of the invention, an oil guide of a hybrid module for a vehicle arranged in a drivetrain between a drive unit, particularly an internal combustion engine, and an output, wherein an electric machine is provided, and a rotor of the electric machine is connected to the output, wherein a clutch is provided between the drive unit and the electric machine, is characterized in that the clutch has oil conducting elements in order to supply the electric machine with cooling oil.

Embodiment forms of an oil guide are characterized in that the clutch is formed as a cone clutch, in that the cone clutch has at least one outer friction ring (ARR) and one intermediate friction ring (ZRR), in that the outer friction ring (ARR) is connected to the rotor, and in that the cone of the cone clutch in the open state forms an oil guide to an axial end of the rotor.

Advantageous embodiment forms of an oil guide are characterized in that, at the outer friction ring (ARR), bores are provided at the tapered side of the cone in order to conduct cooling oil to the other axial end of the rotor.

Oil guides according to embodiment forms are characterized in that the outer friction ring (ARR) is formed integral with a rotor carrier of the rotor of the electric machine.

Embodiment forms of an oil guide are characterized in that a retaining ring for axial positioning of the clutch protrudes in radial direction relative to the rotor in order to serve as retaining element for cooling oil.

Embodiment forms of an oil guide are characterized in that a return spring of the clutch is formed as cup spring, and in that orifices are provided at the inner diameter of the cup spring for controlling oil.

Oil guides according to embodiment forms are characterized in that an oil baffle is provided at the clutch.

Advantageous embodiment forms of an oil guide are characterized in that the oil baffle is mounted in or welded to the inner friction ring (IRR) or intermediate friction ring (ZRR).

A further aspect of the invention is a hybrid module with an oil guide according to one of the described embodiment forms.

Embodiment forms of a hybrid module are characterized in that a torsional damper is arranged between the drive unit and the electric machine upstream and/or downstream of the clutch.

Hybrid modules according to embodiment forms are characterized in that the cone clutch is operatively connected on the driven side to a torque converter.

Embodiment forms of a hybrid module are characterized in that the cone clutch has only one friction surface.

Hybrid modules according to embodiment forms are characterized in that the cone clutch has at least one outer friction ring (ARR) and one intermediate friction ring (ZRR), and in that outer friction ring (ARR) is connected to the rotor.

Further embodiment forms of a hybrid module are characterized in that the outer friction ring (ARR) is formed integral with a rotor carrier of the rotor.

Hybrid modules according to preferred embodiment forms are characterized in that a connection plate is provided on the driving side, and the intermediate friction ring (ZRR) is connected to the connection plate by positive engagement in circumferential direction and is moveable axially with respect to the connection plate.

Embodiment forms of a hybrid module are characterized in that the cone clutch has an inner friction ring (IRR), and in that the outer friction ring (ARR) and the inner friction ring (IRR) are arranged so as to be fixed with respect to rotation relative to one another.

Hybrid modules according to embodiment forms are characterized in that the intermediate friction ring (ZRR) is formed in a segmented manner.

Embodiment forms of a hybrid module are characterized in that the cone clutch is formed as a normally open type.

Hybrid modules in embodiment forms are characterized in that the cone clutch is formed with at least one inserted friction lining that is not fixedly connected to another component part of the cone clutch.

Embodiment forms of a hybrid module are characterized in that the cone clutch can be actuated via a piston, and in that the piston is formed integral with the inner friction ring (IRR).

Embodiment forms of a hybrid module are characterized in that the cone clutch in a normally open type cone clutch tapers in direction of piston actuation, and in that the cone in a normally closed type cone clutch tapers opposite the direction of piston actuation.

Hybrid modules according to embodiment forms are characterized in that an oil baffle is provided at the cone clutch.

Embodiment forms of a hybrid module are characterized in that, for directing oil, a portion of the oil flow is guided through the open cone clutch, and this portion of the oil flow is interrupted when the cone clutch is actuated.

DETAILED DESCRIPTION OF THE PRESENTLY PREFERRED EMBODIMENTS

Figure 1:
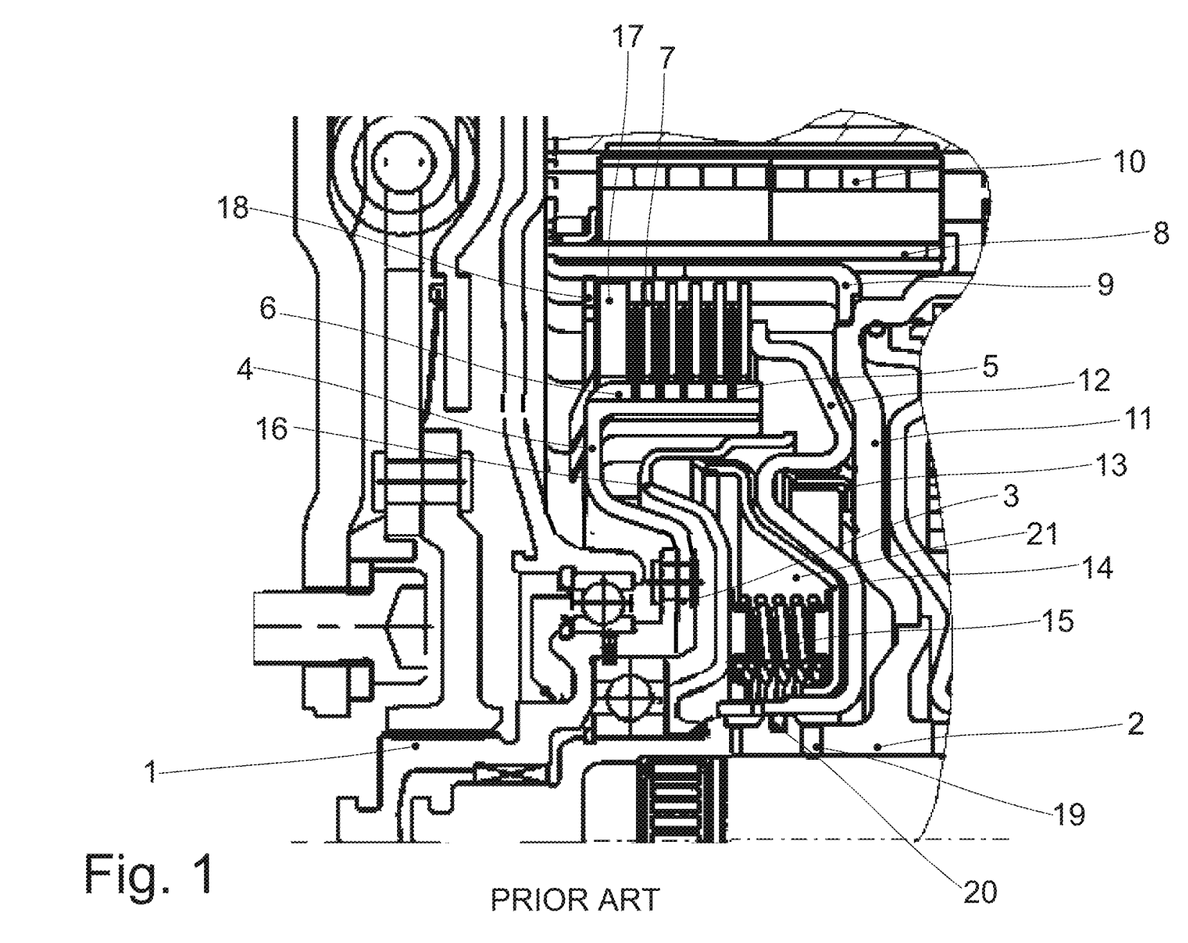
FIG. 1 is an installation space with K0 as wet multiple disk clutch NO.

FIG. 1 shows the construction of a wet multiple disk clutch as K0 which represents the prior art. The inner disk carrier (ILT) 4 is connected to the input part 1 via a rivet connection 3. The inner disks 5 are connected to the ILT via a toothing 6 so as to be fixed with respect to rotation but axially displaceable relative to it. The electric machine (EM) 10 is fastened with the rotor carrier 8 at the outer disk carrier (ALT) 9, and the latter is in turn fastened, shown here as weld connections, to the converter cover 11.

Accordingly, in addition to the support function for the outer disks 7, the ALT also takes over the function of connecting the EM to the converter cover and accordingly forms part of the rotor carrier. The multiple disk clutch is constructed as a "normally open" (NO) system and must be actively pressed via an actuation piston 12 to transmit torque. Owing to the normal force acting on the disks, there results via the coefficient of friction µ at the linings a frictional force which, in accordance with the strength of the contact force, makes possible the transmission of a circumferential force, and therefore, depending on the mean friction radius of the disks, the transmission of a torque.

The force at the piston results from oil pressure acting on the piston surface. The pressure space is formed between converter cover, piston and hub 30. The pressure space is sealed radially outwardly via the piston seal 13 and radially inwardly via a shaft sealing ring 20. The oil supply is carried out via a controlled oil channel 19. When pressure builds up, the piston is displaced to the left against the force of the return spring 15 and presses on the right-hand outer disk. The latter moves to the left via the toothing in the ALT and presses the lamination stack together. The lamination stack comprises an alternating arrangement of outer disks and inner disks. The force is supported via a thicker outer disk, known as the end disk 17, on a retaining ring (snap ring) 18 that fits in a groove of the outer disk carrier. Since the ALT is fixedly connected to the converter cover, the flux of force is closed here. In order to minimize deformations of the component parts as far as possible, a sufficient stiffness must be ensured in the configuration. The converter cover is welded to the hub and forms the output 2. In order to compensate for the influence of rotational speed on oil pressure in the piston chamber which is constantly filled, a compensation space 21 is provided. The latter is formed by a sealing plate 16 and a seal 14. The compensation space is likewise supplied with oil via an oil channel. However, it is not acted upon by pressure. Further, the compensation space has only one seal radially outward on the level of the piston seal. Overflow channels are provided radially inwardly for the displacement of the oil during piston actuation. Without oil pressure in the oil chamber, the return spring can press the oil back into the piston chamber through the oil channel 19.

Figure 2:
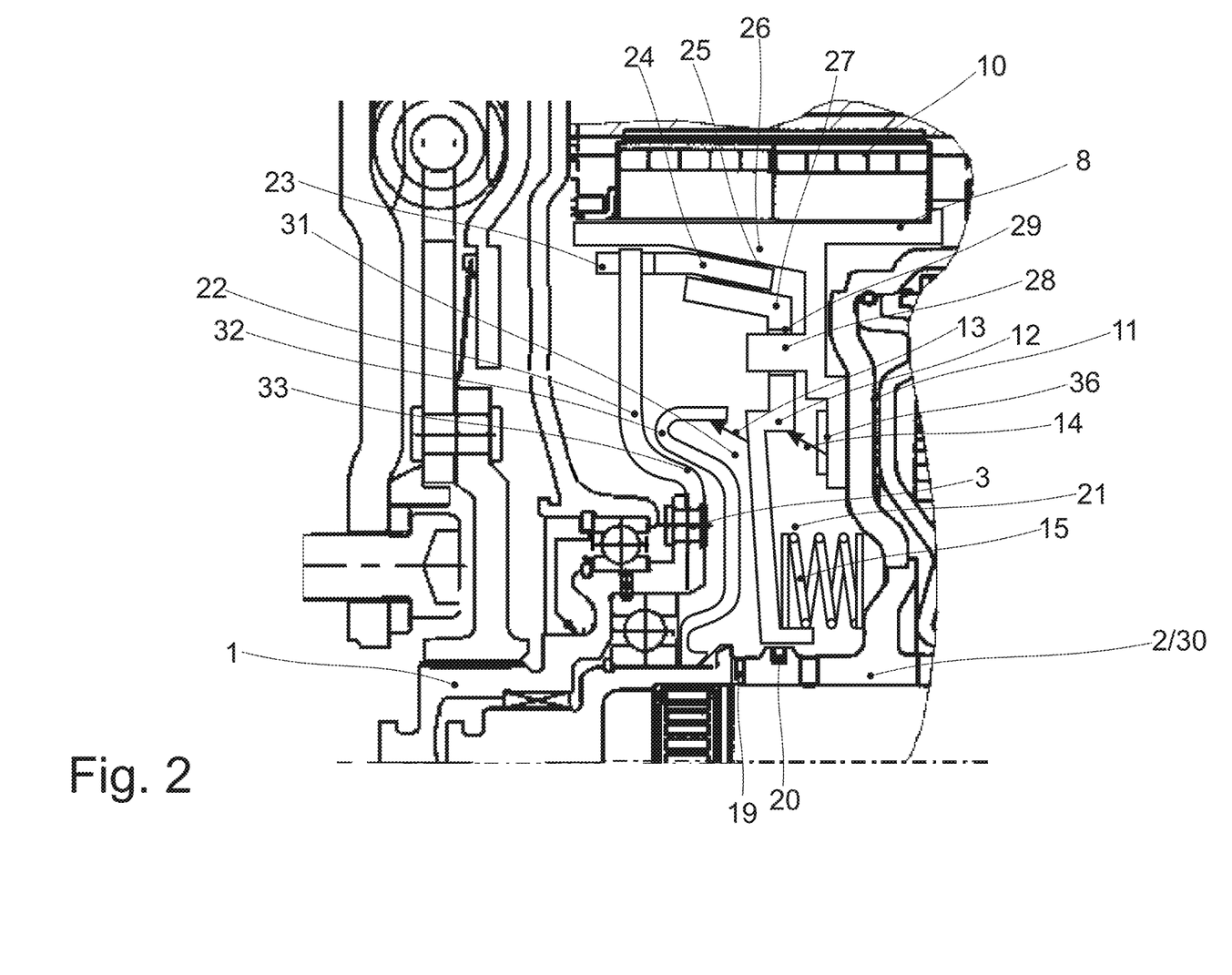
FIG. 2 is a construction of cone clutch K0 with left-handed cone as NO.

FIG. 2 shows a construction of the K0 as NO type cone clutch with left-handed cone. Compared to the multiple disk clutch in FIG. 1, the piston chamber and the compensation space 21 are interchanged. Therefore, the oil channels must also be interchanged. The piston actuation is carried out to the right in this case. The cone element is connected to the input part 1 via a carrier plate 22 which is, e.g., riveted or welded or fixed with respect to relative rotation is some other manner and secured against axial displacement. This carrier plate has cutouts in which the dogs 23 of the intermediate friction ring (ZRR) 24 engage. The torque is transmitted on the one hand and a radial and axial compensation is made possible on the other hand via this dog plug-in connection. For radial tolerance compensation, there must be play between the dogs and the cutouts in circumferential direction as well as radial direction.

As an alternative to a dog plug-in connection with play, a tolerance compensation can also be carried out through the connection of the cone element to a spring set (torsional damper) arranged upstream or downstream. Depending on design, the torsional damper allows radial and axial relative movement between the input part and output part by separating the input part and output part via a resilient spring element. In order to minimize the imbalance as far as possible, it is advisable to utilize the lighter side of the cone element (ZRR) and of the damper for tolerance compensation (no bearing).

When the piston 12 is actuated, the ZRR is clamped between the outer friction ring (ARR) 26 and the inner friction ring (IRR) 27. The contact force of the piston is multiplied via the cone angle so that the normal force on the friction lining 25 is increased. In this way, with contact force, mean friction radius and friction ratios (friction coefficient) remaining the same, a higher frictional force can be generated compared with a multiple disk clutch so that two friction surfaces are sufficient in this application. The larger actuation path in comparison with a multiple disk clutch is compensated by the smaller required quantity of friction surfaces and, in consequence thereof, smaller running clearance. Limiting to two friction surfaces allows the toothing of the inner disk carrier and outer disk carrier to be omitted. A rotationally locking connection 28 need merely be provided between the inner friction ring and outer friction ring with the possibility of axial displacement.

In this embodiment, the ARR is formed by a portion of the rotor carrier 8. Alternatively, the outer friction ring can also be a separate part which is connected to the rotor carrier so as to be fixed with respect to rotation and axially secured relative to it.

Figure 3:
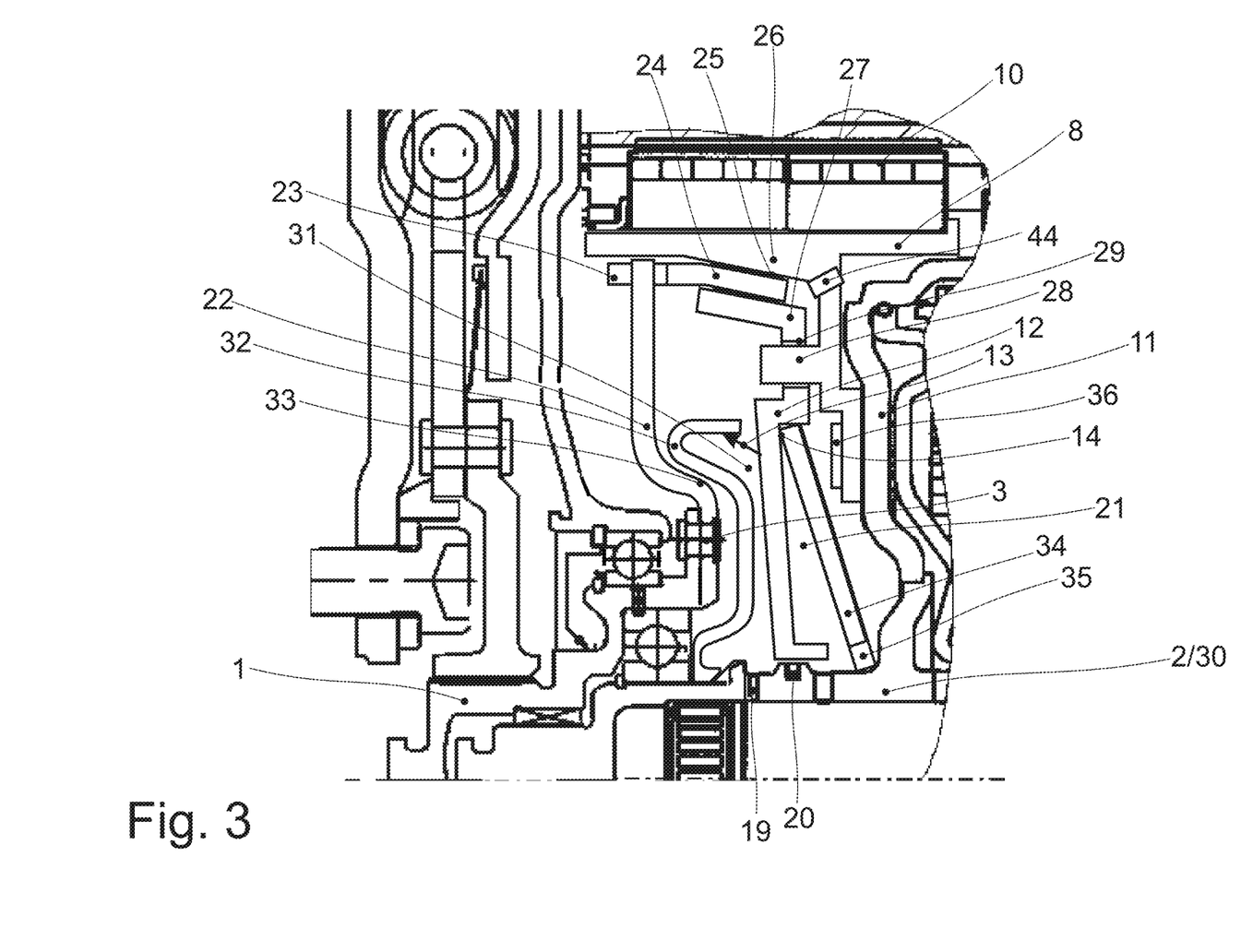
FIG. 3 is a construction of cone clutch K0 with left-handed cone as NO—cup spring.

In this instance, the IRR is part of the actuation piston 12. A separation spring between the inner friction ring and outer friction ring can be omitted by fixedly connecting the inner friction ring or outer friction ring to the piston. The separation and the return of the piston is taken over by the return spring 15. As is shown, this return spring 15 can be constructed as helical compression spring (SDF) set or, as is shown in FIG. 3, may be constructed as a cup spring 34.

The element for preventing rotation 28 between the inner friction ring and outer friction ring is ensured in this case by a pin 28 or comparable positive-locking element at the rotor carrier which engages in cutouts 29 at the inner friction ring and permits an axial displacement. Alternatively, the IRR may also be connected to the ARR or rotor carrier via:

tangential leaf springs;
a sliding spline (e.g., spline shaft toothing) between piston and hub;
a cup spring (as return spring) that is mounted at the IRR and at the hub or converter cover so as to prevent rotation (positive engagement) and can accordingly transmit torque.

The hub is fixedly connected to the converter cover that is the driven end. The rotor carrier is likewise fixedly connected to the converter cover. In this case, this connection is formed as rivet connection 36 via an injection molded rivet at the converter cover. The rivet heads can also be completely recessed in the rotor carrier plate.

Oil pressure is introduced in the piston chamber 31 via the controlled oil channel 19 for piston actuation. Via the piston surface, this causes a force which works against the return spring 15, moves the piston and, therefore, the IRR to the right and clamps the ZRR between IRR and ARR. The piston chamber is formed by the sealing plate 32, the piston and the hub 30. In so doing, a static seal is used between sealing plate and hub, and two dynamic seals, piston seal 13 between sealing plate and piston and between piston and hub 20.

As is shown, the compensation space is formed by a piston, hub, and converter cover. A seal 14 seals the compensation space radially outward. When a cup spring is used as return spring, the compensation space can be formed between piston, hub and cup spring. The seal 14 must then be arranged between cup spring and piston on the same diameter as the piston seal.

In a variant with cup spring (FIG. 3) as return spring, the cooling oil flow can be guided radially outward through orifices at the inner diameter of the cup spring 35 between converter cover and cup spring and can therefore be guided directly to the cone. The cone element can also be utilized directly for oil control. For example, the cooling oil in the open state of the clutch could be distributed in such a way that one portion runs to the left through the cone and the other portion runs to the right through a bore 44. In the closed state, the cone seals off the oil flow to the left and the oil is guided in its entirety to the right through the bore 44.

This connection variant of the cone clutch offers the possibility of an additional parallel frictional engagement, and therefore the increase in the transmissible torque. When the stiffness of the sealing plate 32 is correspondingly configured, an additional frictional contact can be carried out between sealing plate 32 and carrier plate 22 after a determined oil pressure is reached. To this end, the sealing plate 32 must be connected to the hub so as to be fixed with respect to rotation relative to it.

Figure 4:
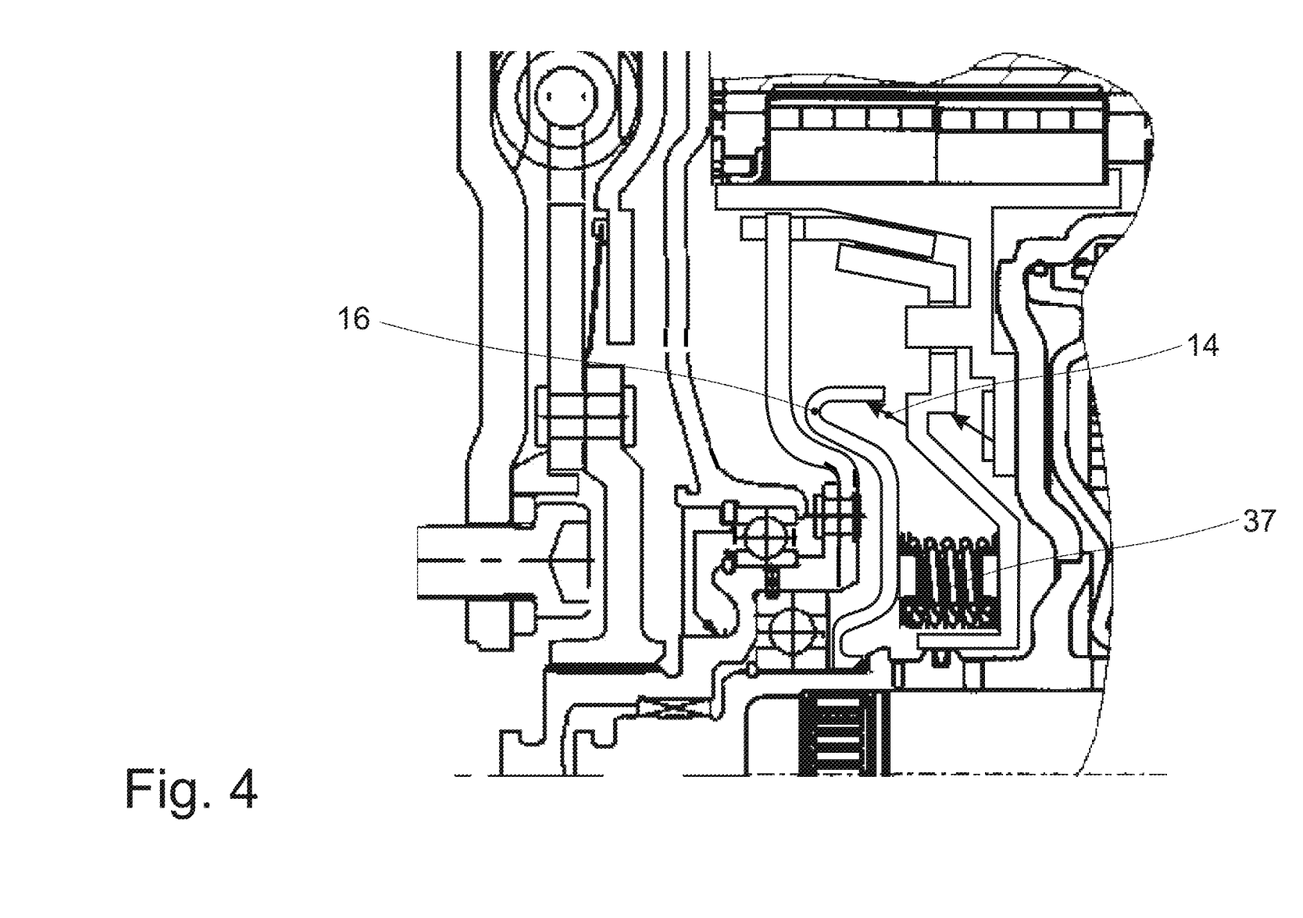
FIG. 4 is a construction of cone clutch K0 with left-handed cone as NC.
Figure 5:
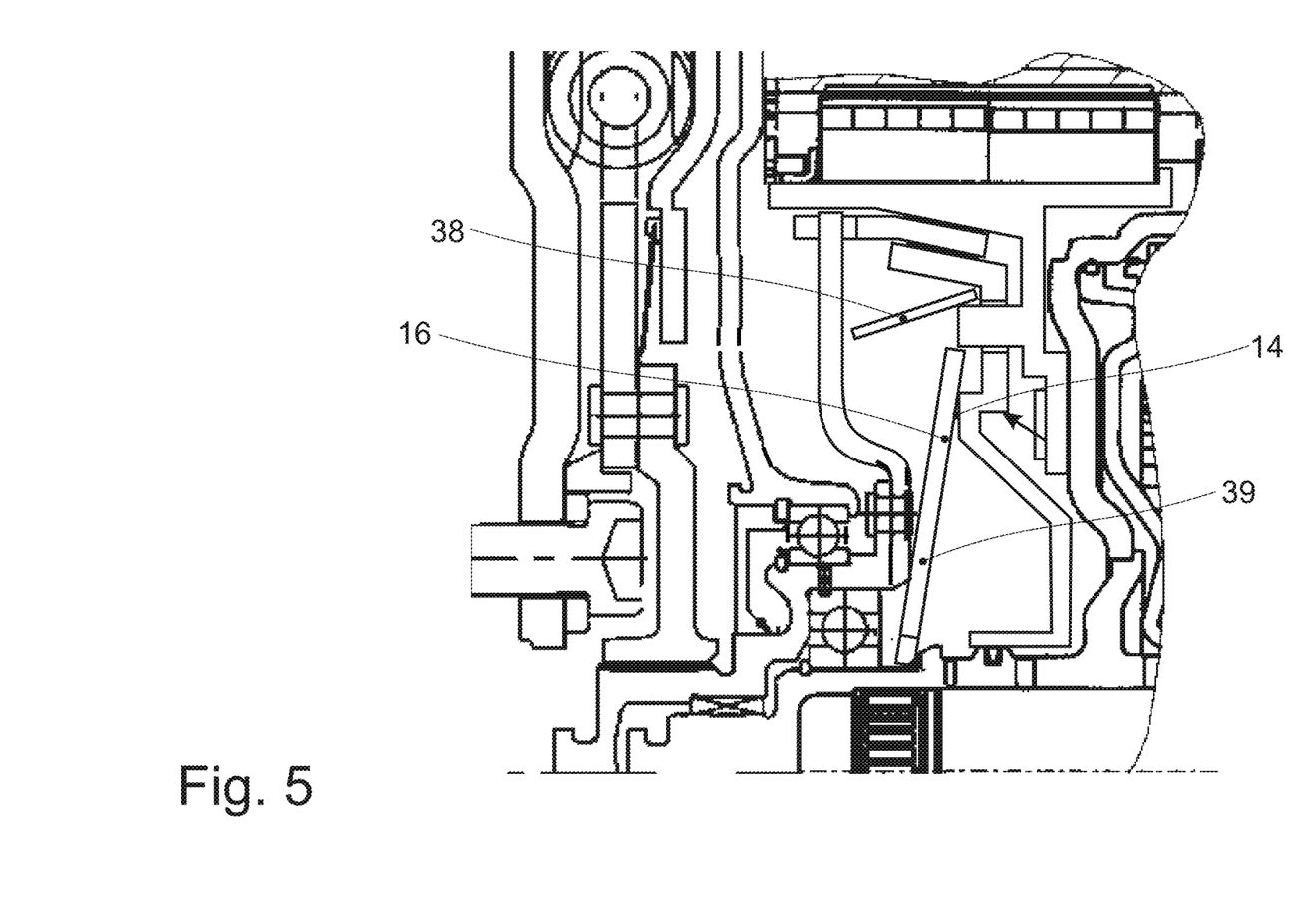
FIG. 5 is a construction of cone clutch K0 with left-handed cone as NC—cup spring.

FIG. 4 shows the same construction of the cone clutch as a normally closed (NC) system. In this instance, the compensation space and the pressure space are arranged comparable to FIG. 1. The depicted spring set 37 does not serve in this instance for return but rather must apply the maximum required closing force. As is shown in FIG. 5, this closing spring can also be constructed as cup spring 39. An advantage herein consists in the supporting of the cup spring radially far inside at the sealing plate 16 of the compensation space. Therefore, the sealing plate need not be so robustly constructed. The sealing plate could even be omitted entirely if the cup spring 39 takes over this function and, as has already been described, the sealing of the compensation space 14 is carried out between cup spring and piston.

The flow of cooling oil to the cone can be carried out via an oil baffle 38 (FIG. 5) which is mounted in or welded to the IRR.

Figure 6:
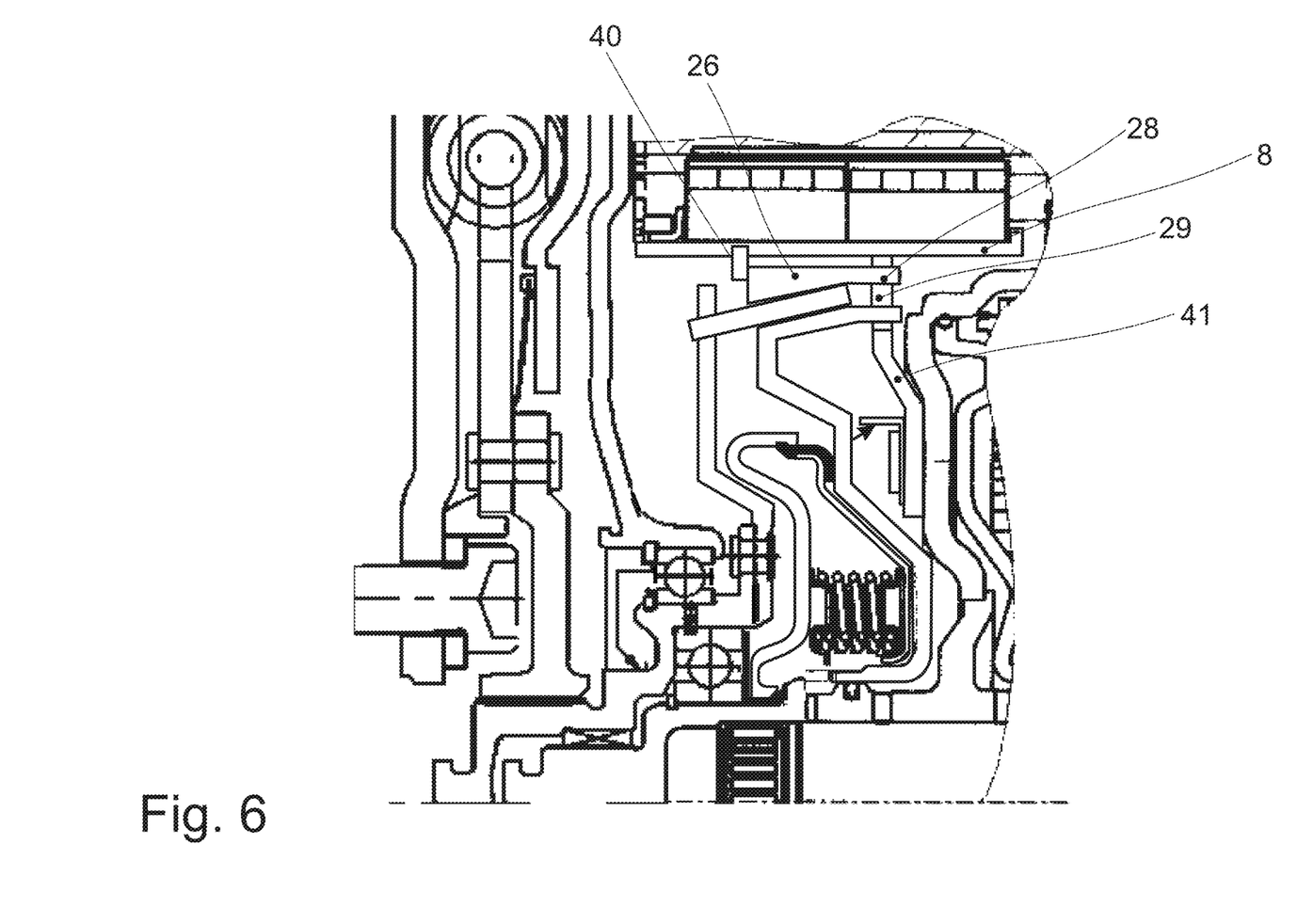
FIG. 6 is a construction of cone clutch K0 with right-handed cone as NO.

FIG. 6 shows a constructional variant with a right-handed cone. Accordingly, compared with the left-handed cone, the actuation direction is reversed. The depicted variant shows a NO design. The pressure space is on the right and the compensation space is on the left.

Figure 7:
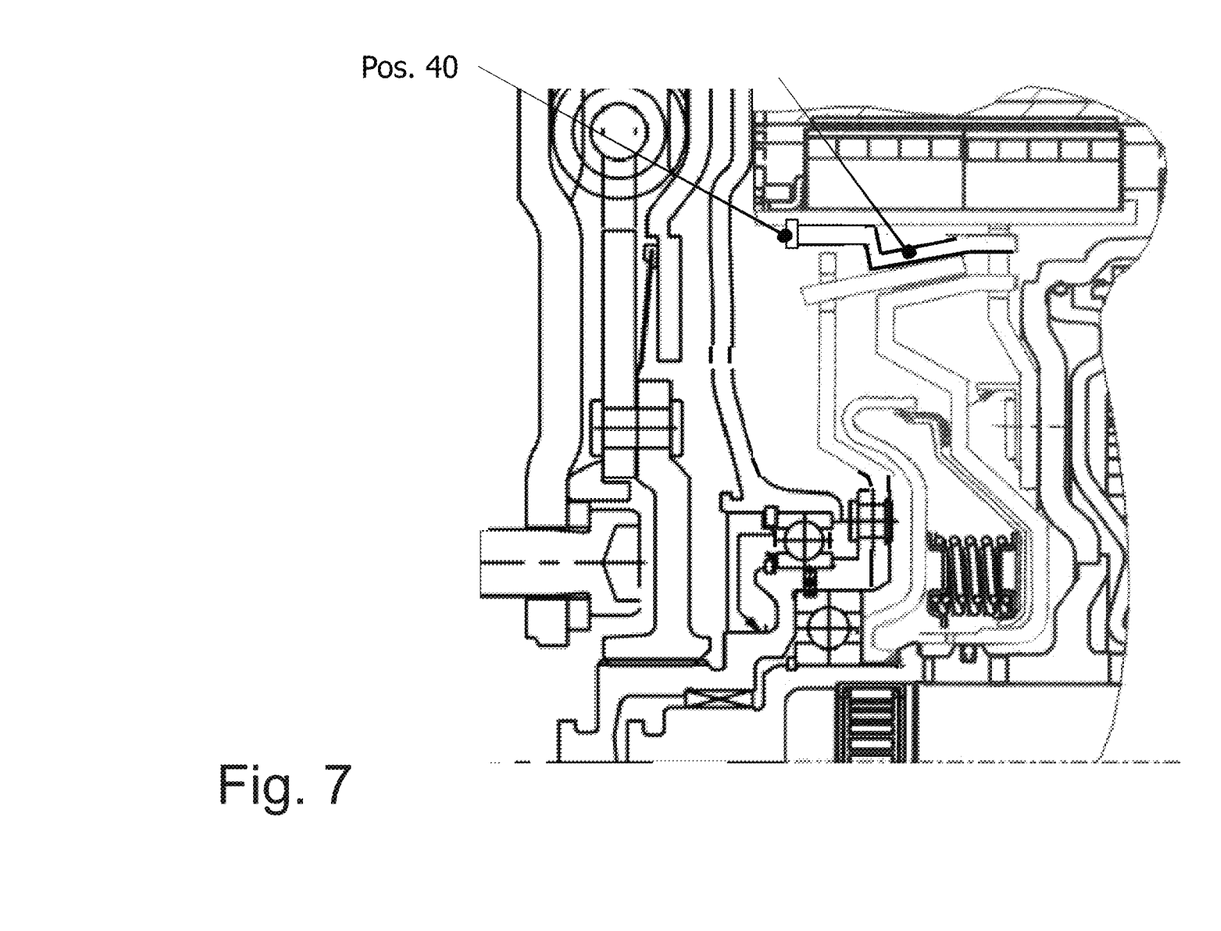
FIG. 7 is a construction of cone clutch K0 with right-handed cone as NO—ARR plate design.

During piston actuation, the piston is pressed with IRR to the left and clamps the ZRR between the IRR and ARR. The ARR 26 is supported axially via a retaining ring 40 which is inserted in the rotor carrier 8. FIG. 7 shows an alternative embodiment form of the ARR in the design of the plate. The rotor carrier is welded, for example, to a carrier plate 41 which in turn is riveted to the converter cover, for example. The carrier plate 41 comprises cutouts 29 in which dogs 28 of the ARR and the IRR engage in a positive-locking manner and prevent rotation. Axial displaceability remains ensured. This plug-in connection should be carried out on the largest possible diameter, as has already been described, in order to minimize the frictional forces that act against an axial displacement under torque.

Figure 8:
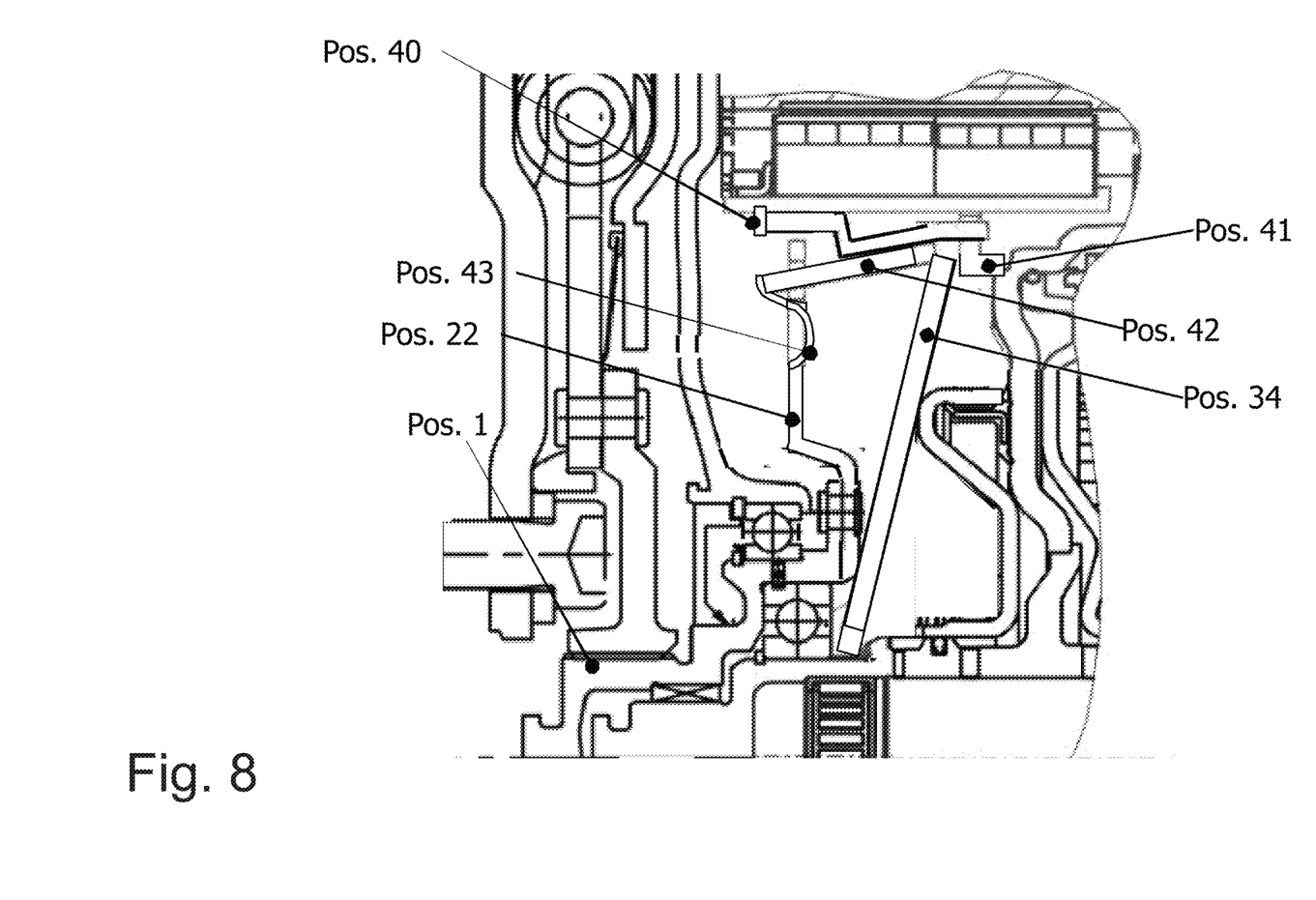
FIG. 8 is a construction of cone clutch K0 with right-handed cone as NO with only one friction surface—minimal design without compensation space.

FIG. 8 shows a construction of the cone K0 with right-handed cone as NO design as in FIG. 6 with only one friction surface and without compensation space and represents a minimal design for small torques. The torque introduced is no longer transmitted to the two paths ARR and IRR via a ZRR. There is no ZRR present in this case. The previous ZRR takes over the function of the IRR 42. The piston in this case presses on the return spring constructed as cup spring 34. Since a compensation space has been omitted in this example, the return spring must be strong enough that the oil pressure occurring in the piston chamber at maximum speed does not cause the clutch to close. In this instance, in addition, the cup spring 34 takes over the function of transmitting force from the piston to the IRR 42 and presents a lever mechanism. The actuation force of the piston on the IRR is stepped down via the leverage ratios. Therefore, it is advantageous when the connection of the piston to the cup spring is carried out as far radially outward as possible. If the piston were connected on a diameter greater than that of the IRR, a multiplication would be carried out. However, this conflicts with a friction radius of the cone that is as large as possible.

Since the arrangement with only one friction surface in this embodiment example does not permit a direct coupling between the piston and IRR, the separation of the friction surfaces in the no-pressure condition (NO) must be ensured by means of an additional spring 43. The ARR is supported at the rotor carrier in this instance also via a retaining ring 40. When installed to the right, the retaining ring ensures that the clutch can be mounted. The carrier plate 22 is mounted, e.g., riveted, at the input part 1 with pre-inserted separation spring 43. Cup spring, IRR and ARR are inserted on the transmission side and secured via the retaining ring 40. The clutch is completed when the transmission is assembled at the engine in that the IRR 42 is inserted into the cutouts at the carrier plate 22. In so doing, the separation springs 43 ensure the running clearance between IRR and ARR. In order to prevent drag torques in the open state, it should be ensured that there is a second running clearance between cup spring and IRR in the open state.

In this embodiment example, the rotor carrier is welded to the carrier plate 41, and the carrier plate is in turn welded to the converter cover.

Figure 9:
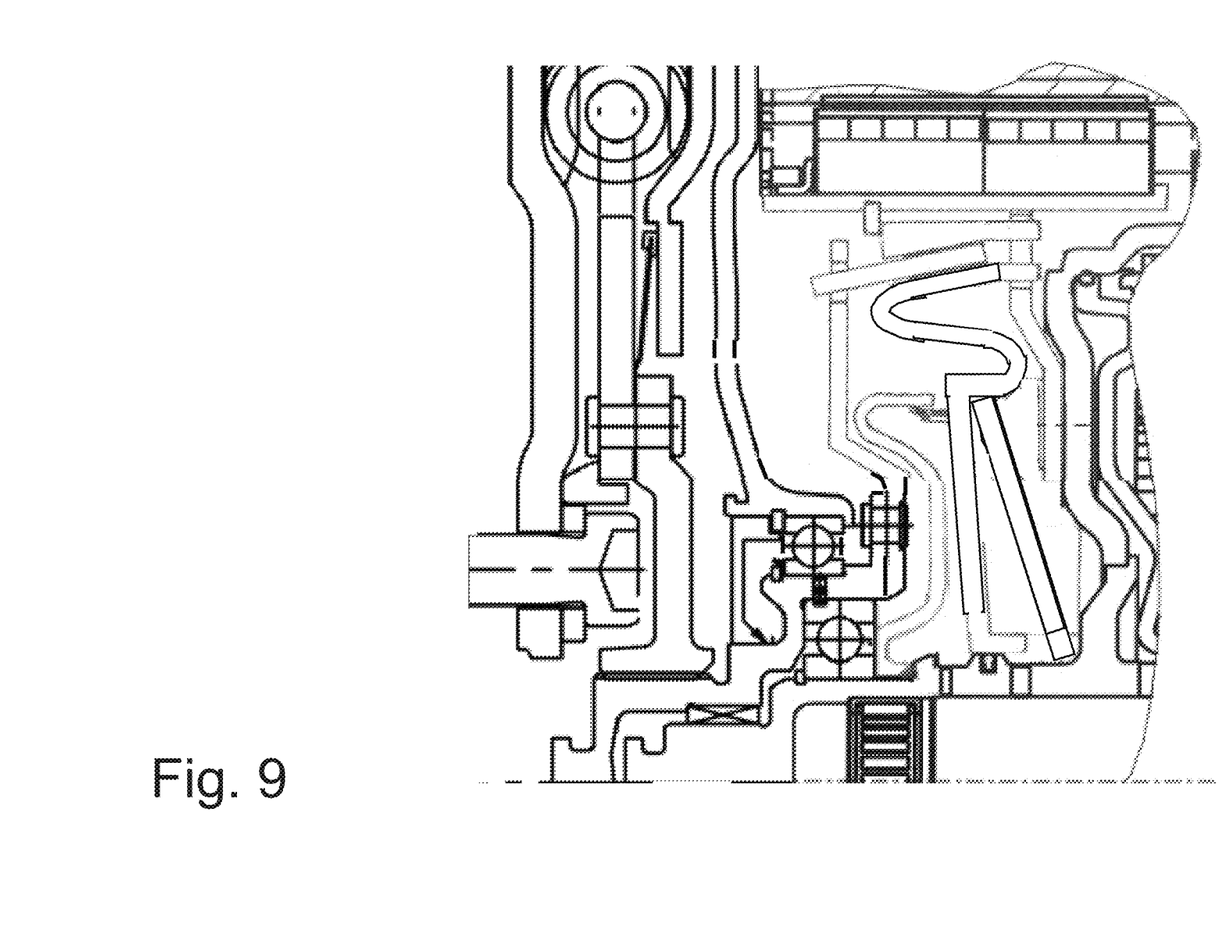
FIG. 9 is a construction of cone clutch K0 with right-handed cone as NC.

FIG. 9 shows a construction of the cone K0 with right-handed cone as NC.

Figure 10:
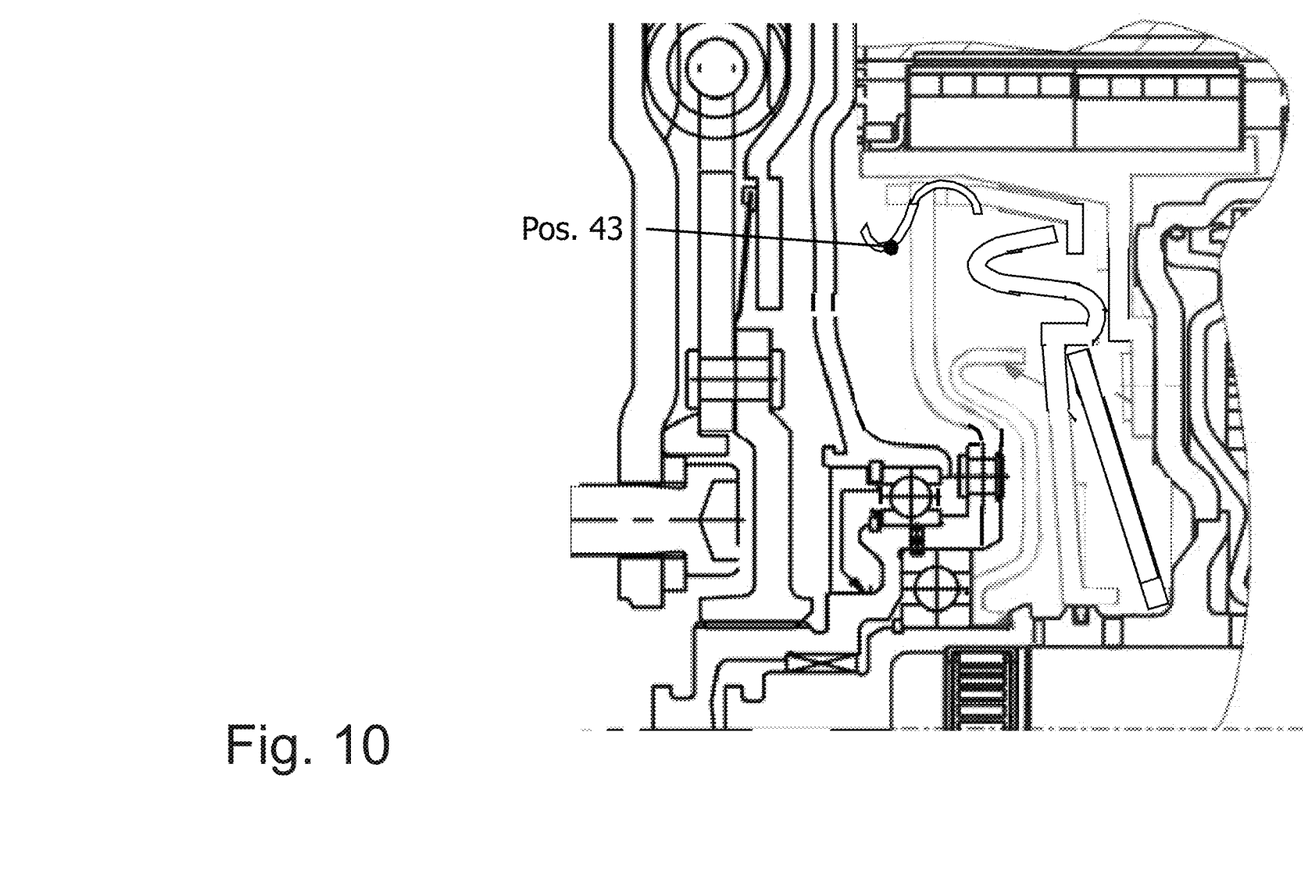
FIG. 10 is a construction of cone K0 with left-handed cone as NO with only one friction surface—minimal design without compensation space.

FIG. 10 shows a construction of the cone K0 with left-handed cone as NO with only one friction surface. The compensation space can be formed in this instance by the cup spring with additional sealing element or, as is shown in FIG. 8, can be entirely omitted. An additional spring 43 must likewise be used for the separation of the friction surfaces. It must be ensured during assembly that the separation spring is pre-mounted at the IRR and that the IRR is inserted into the cutouts at the carrier plate 22 when the transmission is assembled at the engine such that the separation springs snap in at the carrier plate and pull the IRR in direction of the carrier plate.

Figure 11:
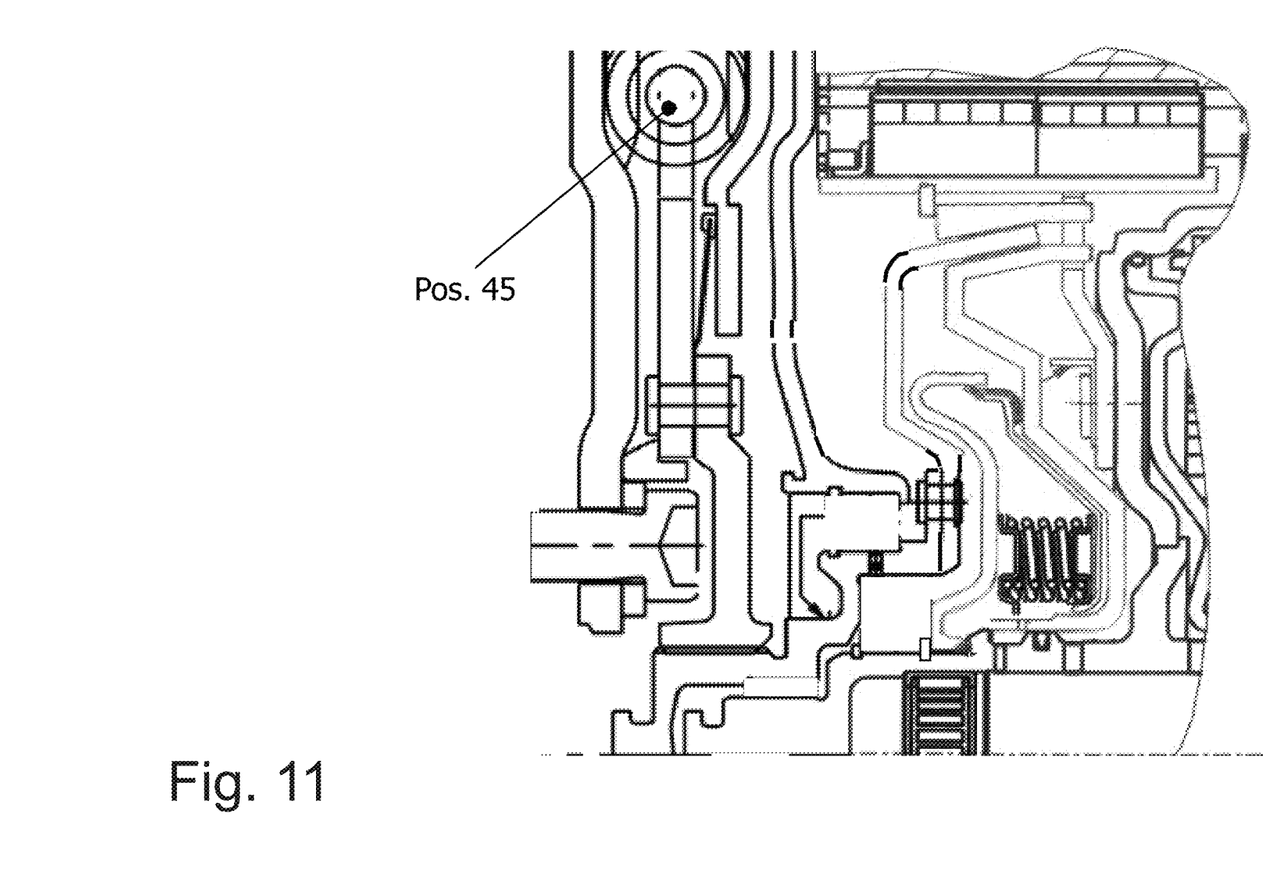
FIG. 11 is a construction of cone K0 with right-handed cone as NO—ZRR connected to torsional damper.

In FIG. 11, the ZRR is held via the torsional damper and tolerance compensation can be effected in both axial and radial direction by the spring set of the torsional damper. In further embodiment forms however, the torsional damper can also be arranged at another location. Alternatively, tolerance compensation can also be carried out by a further torsional damper at another location.

Friction linings 25 are glued to the ZRR. Possibly, these friction linings may also simply be inserted only between ZRR and IRR and between ZRR and ARR. However, the stiffness and strength must then be sufficiently high to withstand tensile and compressive forces occurring during slip (condition when closing with difference in speed between ZRR and inner friction ring and outer friction ring from the first friction contact until clutch is completely synchronized and closed).

As an alternative to a dog plug-in connection with play, a radial tolerance compensation (offset/angular error) can also be carried out by the connection of the cone element to an upstream or downstream spring set (torsional damper). For reasons pertaining to design, the torsional damper permits radial and axial relative movement between input part and output part by separation of the input part and output part via a resilient spring element. In order to minimize imbalance, it is advisable to utilize the lighter side of the cone element (ZRR) and of the damper for tolerance compensation (no bearing). If this is not desirable, the degree of freedom must be limited via appropriate bearing designs.

Omission of the toothing of the outer disk carrier and inner disk carrier because this clutch makes do with only two friction surfaces and therefore with only two torque paths. The coupling of the inner friction ring and outer friction ring is carried out by:
  a positive engagement between rotor carrier and IRR which constitutes a rotationally fixed connection with the possibility of axial displacement—ideally on large diameter in order to minimize frictional forces;
  tangential leaf springs which can transmit torque in circumferential direction pull direction and permit axial displacement through deformation; accordingly, there are no additional frictional forces in contact which counteract actuation; the push direction can be additionally limited via stops in order to protect the tangential leaf springs against bending;
  a positive engagement in the form of a sliding spline between piston and hub; the hub is fixedly connected to the converter cover, and the latter is fixedly connected to the rotor carrier/ARR—disadvantage consists in the small connection diameter and consequent high friction forces;
  a cup spring (as return spring) which is fitted rotationally fixedly (positive engagement) to the IRR and to the hub or converter cover and can accordingly transmit torque.

ARR is part of the rotor carrier or is constructed as a separate part, which is inserted in the rotor carrier as free from play as possible and secured axially so as to be fixed with respect to rotation relative to it.

IRR is constructed as part of the actuation piston.

Additional parallel frictional contact between sealing plate and carrier plate in order to increase transmissible torque.

Cup spring (either return spring or closing spring indifferently) takes over sealing plate function.

Seal for compensation space is fitted to or inserted in cup spring.

Cup spring with bores at the inner diameter for conducting oil, cooling oil flow and for overflow during piston actuation.

Cone element is used for controlling or guiding the cooling oil flow. Cone open corresponds to line open and cone closed corresponds to line sealed.

Cup spring takes over function of a lever for transmitting force from the piston to the IRR as is shown in FIG. 8. Different reductions or multiplications can be employed depending upon the position of the force application points.

Separation spring is mounted in the carrier plate, for example, when only one friction surface is formed.

Intermediate friction ring is not formed as closed ring but rather as a segmented ring in order to compensate for tolerances.

Friction linings are not glued on but only inserted. The facing cannot creep out owing to the conical shape. This has the advantage that adhesive work can be omitted. However, the following must be taken into account in such embodiment forms:
  The friction lining must be stiff enough so that it does not crease on contact.
  The friction lining must have sufficient strength so as not to tear.
  The drag torque of the clutch in the open state could increase through contact of the friction lining between outer friction ring and inner friction ring.

Minimum construction for small torques cone clutch with only one friction surface Shown in FIGS. 8 and 10.

The invention is not limited to the described embodiments. As stated above, only individual features may also be provided or various features from different examples may be combined.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An oil guide of a hybrid module for a vehicle arranged in a drivetrain between a drive unit and an output, wherein an electric machine is provided, and a rotor of the electric machine is connected to the output, comprising:
   a clutch between the drive unit and the electric machine; and
   oil conducting elements configured to supply the electric machine with cooling oil,
   wherein the clutch is a cone clutch having at least one outer friction ring and one intermediate friction ring,
   wherein the at least one outer friction ring is connected to the rotor, and
   wherein a cone of the cone clutch in an open state forms an oil guide to an axial end of the rotor,
   wherein, at the at least one outer friction ring, bores are provided at a tapered side of the cone to conduct cooling oil to an other axial end of the rotor.

2. The oil guide according to claim 1, wherein the at least one outer friction ring is integrally formed with a rotor carrier of the rotor of the electric machine.

3. The oil guide according to claim 1, further comprising a retaining ring for axial positioning of the clutch that protrudes in radial direction relative to the rotor to serve as a retaining element for cooling oil.

4. The oil guide according to claim 1, wherein a return spring of the clutch is formed as cup spring, and orifices are provided at an inner diameter of the cup spring for controlling oil.

5. The oil guide according to claim 1, wherein an oil baffle is provided at the clutch.

6. The oil guide according to claim 5, wherein the oil baffle is mounted in or welded to the one inner friction ring or the one intermediate friction ring.

7. A hybrid module with an oil guide for a vehicle arranged in a drivetrain between a drive unit and an output, wherein an electric machine is provided, and a rotor of the electric machine is connected to the output, comprising:
   a clutch between the drive unit and the electric machine; and
   oil conducting elements configured to supply the electric machine with cooling oil,
   wherein the clutch is a cone clutch having at least one outer friction ring and one intermediate friction ring,
   wherein the at least one outer friction ring is connected to the rotor, and
   wherein a cone of the cone clutch in an open state forms an oil guide to an axial end of the rotor,
   wherein, at the at least one outer friction ring, bores are provided at a tapered side of the cone to conduct cooling oil to an other axial end of the rotor.

8. The oil guide according to claim 1, wherein the drive unit is an internal combustion engine.

* * * * *